(No Model.) 2 Sheets—Sheet 1.
S. H. SHORT.
SPAN WIRE FOR OVERHEAD ELECTRIC RAILWAYS.
No. 513,426. Patented Jan. 23, 1894.
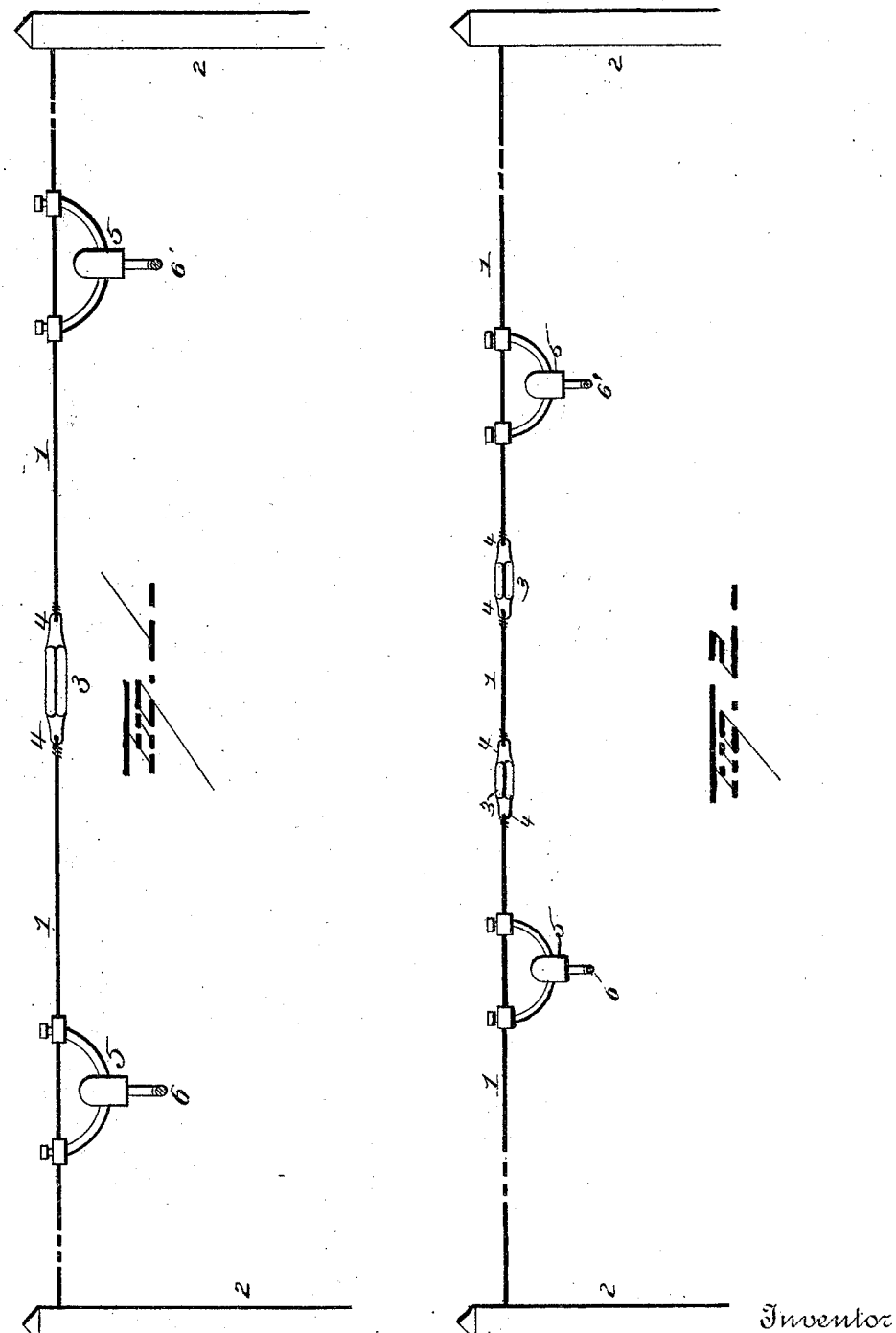
Witnesses
Inventor
Sidney H. Short
By his Attorney (No Model.) 2 Sheets—Sheet 2.
S. H. SHORT.
SPAN WIRE FOR OVERHEAD ELECTRIC RAILWAYS.
No. 513,426. Patented Jan. 23, 1894.
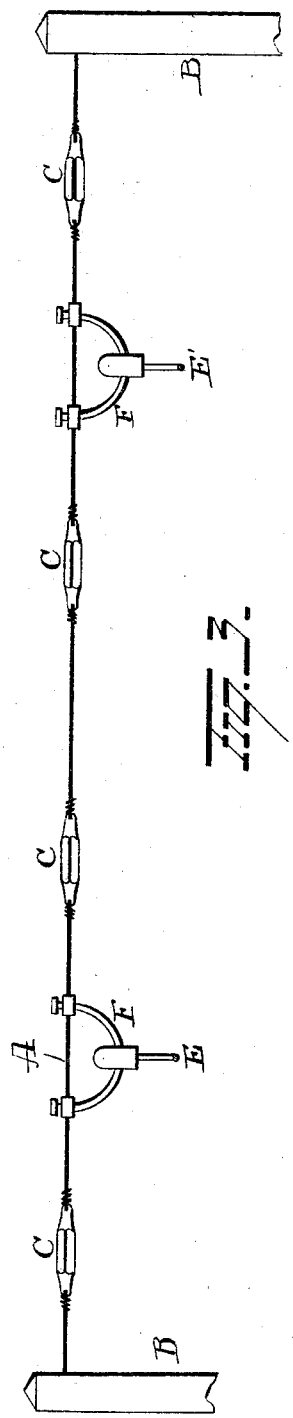

UNITED STATES PATENT OFFICE.

SIDNEY H. SHORT, OF CLEVELAND, OHIO, ASSIGNOR TO THE SHORT ELECTRIC RAILWAY COMPANY, OF SAME PLACE.

SPAN-WIRE FOR OVERHEAD ELECTRIC RAILWAYS.

SPECIFICATION forming part of Letters Patent No. 513,426, dated January 23, 1894.

Application filed April 1, 1890. Serial No. 346,168. (No model.)

*To all whom it may concern:*

Be it known that I, SIDNEY H. SHORT, of Cleveland, in the county of Cuyahoga and State of Ohio, have invented certain new and useful Improvements in Span-Wires for Overhead Line Conductors for Electric Railways; and I do hereby declare the following to be a full, clear, and exact description of the invention, such as will enable others skilled in the art to which it appertains to make and use the same.

My invention has reference to improvements in span wires for overhead line conductors used in connection with electric railways, the object being to adapt such span wires for supporting two parallel line conductors in such manner that the latter may be used for carrying currents of high tension, without danger of leakage or short-circuiting.

In the more effective systems of electric railways, two parallel overhead line conductors forming a round metallic circuit are used, there being then two trolleys on the motor-car, each for making contact with one of the line conductors to convey the current to and from the motor on the car. These line conductors are usually supported upon span wires, supported upon poles on each side of the track, and crossing the line conductors ordinarily at right angles, and by reason of the great difference of potential between the line conductors at any point on the line, it has heretofore been found impracticable to suspend both line conductors from the same span wires when high tension currents were employed for propulsion; each line conductor then was supported by an independent series of span wires, which added considerably to the first cost of the installation and of the maintenance of the same. In some cases where it was attempted to support two line conductors carrying high tension currents from the same span wires, the insulators attached to the span wires and which in turn, supported the line wires, were found inadequate to prevent partial short-circuiting at each span wire, and since a great number of such span wires must be used in long lines of electric railways, it will be evident that those span wires formed in effect multiple arc connections between the line conductors, whereby a great amount of current was needlessly wasted.

The object of my invention is to overcome this difficulty, and I attain this object by dividing each span wire into two or more sections, effectively insulated from each other and, as is always the case, insulated from the ground. All this will more fully appear from the following detailed description, with reference to the accompanying drawings, in which I have illustrated in—

Figure 1, an elevation of one sectional span wire, equipped with my improvement, and supporting two parallel overhead line conductors; and in Fig. 2, a like view showing the span wire divided into three insulated sections. Fig. 3 is an elevation of one sectional span wire divided into two sections which are insulated from each other and from the ground, each of said insulated sections supporting an overhead line or conductor.

Referring now to Fig. 1, the two sections 1, 1, of the span wire are shown each supported from a pole 2, whereby each is insulated from the ground in the ordinary well-known manner. These two sections are joined by an insulating connector 3, the same consisting of a suitably shaped block of insulating material, provided with an ear 4, at each end of which the inner end of a section of the span wire is secured, in any suitable manner. At equal distances from the ends of the insulating connector is secured, upon each section of the span wire, an insulator 5, of any ordinary or improved construction, such as is employed in electric railways for supporting overhead line conductors, and these line conductors 6, 6', are held by the insulators in a manner well understood by those skilled in the art. It will be clear that for the purposes of my invention the particular shape and construction of the insulators 5, 5, are of no importance, and while I have shown insulators well adapted for my purpose, I deem it unnecessary to describe the same in detail. It will now be understood that if the two line conductors 6—6' form a round metallic circuit carrying currents of comparatively high tension, there will be a great difference of potential between the points 6, 6', and if the insulating connector 3, were omitted the chances of leakage from one wire to the other, by way of the necessarily imperfect insulators 5, would be very great; and in practice it has been found that it is almost impossible to prevent such leakage or short-circuiting which, where a great number of span wires are used, reduces the available current by a considerable percentage. The insulating connector 3, effectively prevents such leakage, and if it does not entirely prevent the same, it reduces such leakage to a minimum, there being three insulations interposed in series between the two line conductors, and one of these insulations, formed by the insulating connector 3, can be made as perfect as desired, which is not the case with the insulators 5, owing to the necessarily close proximity in the same of the line conductor with other metallic parts of the structure and with the span wires. The insulating connector 3, is, as has been stated above, a solid piece of insulating material, by which the two sections of the span wire are held so far apart than any leakage between these two sections, if it should occur at all, must necessarily be exceedingly slight.

The arrangement shown in Fig. 2, is substantially like that in Fig. 1, with this difference, that in Fig. 2, the span wire is shown as divided into three sections, insulated from each other by two insulating connectors 3, 3, so that in this case there are between the two line wires, four insulations inserted in series, and two of them, formed by the insulating connectors, may be as perfect as desired.

In Fig. 3 I have represented the insulated sections of the span wire connected at their outer ends with the posts 2 or other suitable supports by means of the insulating connectors 7 which may be of the same construction as the insulating connectors 3, or any other suitable means for insulating the sections from posts 2 may be employed. Of course, it will be understood that I am not limited to any particular number of insulated sections of span wires, since the number of sections will depend upon the difference of potential between the line conductors at the particular point, and upon the climatic conditions of the place where the railway is located. It will also be clear that while my invention has special utility in electric railways where two overhead conductors are employed in a round metallic circuit, it is also useful in the case where two parallel tracks are placed side by side, and the motors traveling upon each track are independently supplied with current from a single line conductor. In such railways, one line conductor frequently carries current of much higher tension than the current carried by the other conductor, so that a dangerous difference of potential exists, which is liable to cause leakage from one wire to the other, and my improved span wire, if used in such railways will effectively prevent all leakage or short-circuiting.

Having now fully described my invention, I claim and desire to secure by Letters Patent—

1. In an electric railway, the combination of parallel overhead line conductors, with span wires divided at one or more points between the said conductors into two or more sections insulated from each other and from the ground, substantially as described.

2. In an electric railway, overhead parallel line conductors, in combination with span wires, each composed of two or more sections insulated from each other, at one or more points between said conductors and insulating supports carried by insulated sections of the span wire, for supporting the line wire, substantially as described.

3. In an electric railway, the combination of parallel overhead line conductors, the adjacent points of which have great differences of electric potential, with span wires divided into sections insulated from each other, and from the ground, each line wire supported by one such section, substantially as described.

In testimony whereof I have signed this specification in the presence of two subscribing witnesses.

SIDNEY H. SHORT.

Witnesses:
A. B. CALHOUN,
JOHN C. DOLPH.